(12) United States Patent
Smith et al.

(10) Patent No.: US 12,001,991 B1
(45) Date of Patent: Jun. 4, 2024

(54) APPARATUS AND METHODS FOR PROVIDING A SKILL FACTOR HIERARCHY TO A USER

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/142,274

(22) Filed: May 2, 2023

(51) Int. Cl.
*G06Q 10/00* (2023.01)
*G06Q 10/0639* (2023.01)

(52) U.S. Cl.
CPC ............................... *G06Q 10/06398* (2013.01)

(58) Field of Classification Search
CPC ............. G06Q 10/063; G06Q 10/0639; G06Q 10/06398
See application file for complete search history.

(56) References Cited

U.S. PATENT DOCUMENTS

| | | | |
|---|---|---|---|
| 11,126,949 B1 | 9/2021 | Shook | |
| 2017/0109850 A1* | 4/2017 | Chetlur | G06Q 50/2057 |
| 2018/0197078 A1* | 7/2018 | Khan | G06N 20/00 |
| 2018/0232751 A1* | 8/2018 | Terhark | G06Q 10/063118 |
| 2019/0035297 A1 | 1/2019 | Barrett | |
| 2021/0312369 A1* | 10/2021 | Marhok | G06Q 10/1097 |
| 2022/0020282 A1* | 1/2022 | Elewitz | G06F 16/2246 |
| 2022/0318716 A1 | 10/2022 | Dandan | |
| 2022/0327487 A1* | 10/2022 | Vontobel | G06N 3/045 |

OTHER PUBLICATIONS

Fok, A. W. P., & Ip, H. H. S. (2006). An agent-based framework for personalized learning in continuing professional development. International Journal of Distance Education Technologies, 4(3), 48-56,58-61. (Year: 2006).*

* cited by examiner

*Primary Examiner* — William S Brockington, III
(74) *Attorney, Agent, or Firm* — Caldwell Intellectual Property Law

(57) ABSTRACT

An apparatus and method provide a skill factor hierarchy to a user. Apparatus may include a computing device including a processor and a memory connected to the processor. The processor may receive a commitment datum describing user activity to match a target and identify a novelty datum as a function of the commitment datum. The processor may identify a first skill factor datum as a function of the novelty datum. Refining the first skill factor datum may include classifying the novelty datum to the first skill factor datum and aggregating the first skill factor datum with a second skill factor datum based on the classification. The processor may generate an interface query data structure including an input field based on aggregations of the skill factor datum and configure a remote display device to at least display the first skill factor and at least the second skill factor datum hierarchically.

25 Claims, 7 Drawing Sheets

APPARATUS AND METHODS FOR PROVIDING A SKILL FACTOR HIERARCHY TO A USER

FIELD OF THE INVENTION

The present invention generally relates to the field of skill identification and development related coaching for entrepreneurs and business managers. In particular, the present invention is directed to an apparatus and methods for providing a skill factor hierarchy to a user.

BACKGROUND

Current data processing or digital resource management techniques tend to focus on high-level performance trends demonstrated by tracked phenomena, rather than intaking specific points of data corresponding to one or more traits related to efficiently achieving an enumerated target. Prior programmatic attempts to resolve these and other related issues have suffered from inadequate user-provided data intake and subsequent processing capabilities.

SUMMARY OF THE DISCLOSURE

In an aspect, an apparatus for providing a customized skill factor datum to a user is provided. Apparatus may include a computing device including a processor and a memory connected to the processor. The memory contains instructions configuring the processor to receive a commitment datum describing a pattern that is representative of user activity progressing to match a target. The commitment datum may be input by the user, extracted from a database including data describing attributes of the user, or evaluated from data describing interactions with external entities. The processor may identify a novelty datum as a function of the commitment datum using a machine-learning model including a classifier. The novelty datum includes indicators sorted into multiple groups, each group relating to data describing a skill used by the user for achieving the target as indicated by the novelty datum. The classifier is configured to classify at least an element describing the pattern of the commitment datum to the target and generate a skill factor datum. The processor may refine the skill factor datum as a function of the novelty datum. The skill factor datum is classified by the classifier to the novelty datum and aggregated with additional instances of the skill factor datum based on classification. Any one or more instances of the skill factor datum include descriptions relating to acquisition of the skill and descriptions of a frequency of implementation of the skill by the user classified to the target. The processor may generate an interface query data structure including an input field based on aggregations of the skill factor datum. The interface query data structure configures a remote display device to display the input field to the user and receive at least a user-input datum into the input field. The user-input datum describes data for selecting a preferred attribute of any one or more skills associated with one or more instances of the skill factor datum. The remote display device may be configured to retrieve data describing additional attributes related to the preferred attribute of the skill factor datum from a database connected with the processor based on the user-input datum and display a hierarchy of multiple instances of the skill factor datum organized by relevance to the target and the preferred attribute of the user-input datum. At least some instances of the skill factor datum exceeding a threshold are aggregated to display the customized skill factor datum to the user.

In another aspect, a method for providing a customized skill factor datum to a user is provided. The method includes receiving, by a computing device, a commitment datum. In one or more embodiments, the commitment datum may be one or more of input by the user, extracted from a database including data describing attributes of the user, or generated by evaluating data describing interactions with external entities. The commitment datum describes a pattern that is representative of user activity progressing to match a target. The method includes identifying, by the computing device, a novelty datum as a function of the commitment datum using a machine-learning model including a classifier. The novelty datum describes indicators sorted into multiple groups, each group relating to data describing a skill used by the user achieving the target as indicated by the novelty datum. The classifier may classify at least an element describing the pattern of the commitment datum to the target and generate a skill factor datum. The method includes refining, by the computing device, the skill factor datum as a function of the novelty datum. The skill factor datum is classified by the classifier to the novelty datum and aggregated with additional instances of the skill factor datum based on classification. Any one or more instances of the skill factor datum may include descriptions relating to acquisition of the skill and descriptions of a frequency of implementation of the skill by the user classified to the target. The method may include generating, by the computing device, an interface query data structure including an input field based on aggregations of the skill factor datum. The interface query data structure configures a remote display device to display, by the remote display device, the input field to the user. The method includes, receiving, by the remote display device, at least a user-input datum into the input field, the user-input datum including data for selecting a preferred attribute of any one or more skills associated with one or more instances of the skill factor datum. The method includes retrieving, by the remote display device, data describing additional attributes related to the preferred attribute of the skill factor datum from a database connected with the computing device based on the user-input datum. The method includes displaying, by the remote display device, a hierarchy of multiple instances of the skill factor datum organized by relevance to the target based on the preferred attribute of the user-input datum. At least some instances of the skill factor datum exceeding a threshold are aggregated to generate a customized skill factor datum to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
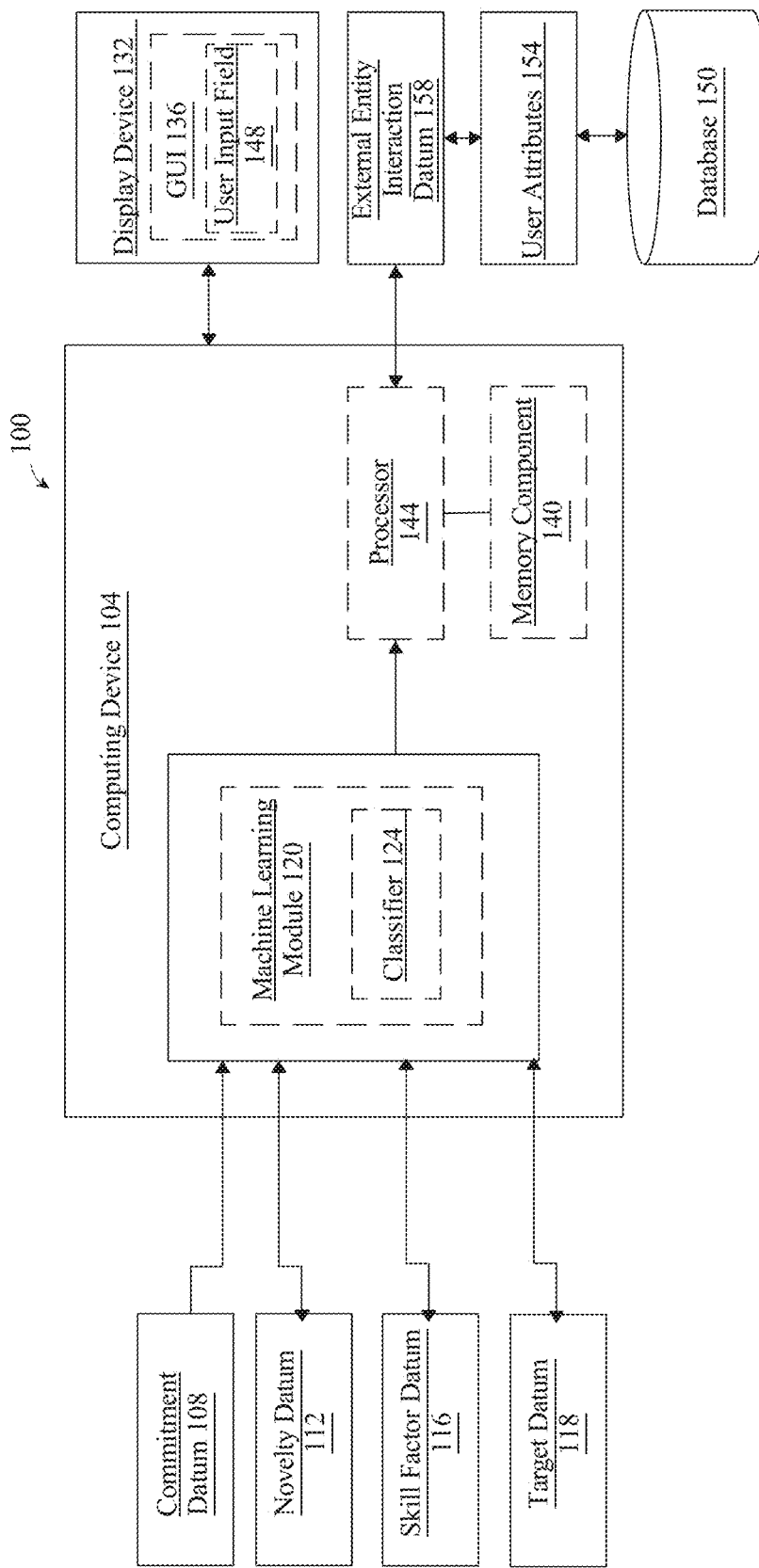
FIG. 1 is a block diagram of an embodiment of an apparatus for data processing relating to providing a personal performance data output.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for data processing relating to providing a customized skill factor datum to a user. Described processes are executed by a computing device including a processor, which is configured to execute any one or more of the described steps. A memory is connected to the processor and contains instructions configuring the processor to receive a commitment datum. Examples may include commitment towards regular practice sessions in an area of interest, such as learning a foreign language, martial art, or sport. Commitment data may include novelty assessed by monitored intervals, such as increasing progressive resistance (e.g., "weight") training over time as evidenced by lifting heavier weights, completing more repetitions, or changing movements, etc.

In some embodiments, such commitment data may be input into the apparatus manually by a user associated with an establishment, such as a business, a fitness gym, a martial arts studio, a university, and/or any other type of entity. Such entry may be performed by, for example, touching interactive sections on a touch-sensitive smartphone or other digital peripheral or device to enter the commitment data. Alternatively, in some other embodiments, commitment data may be obtained by other means, such as being digitally extracted from a business or some other type of profile, which may include prior achievements of a user in various fields such as business, finance, and personal affairs, such as dating, relationships and/or the like. As an example, a business profile may include business records such as financial records, inventory record, sales records, and the like.

In addition, or as an alternative, a dating profile may include personal photos of vacations or participating in recreational activities or at events, as well as a textual description of lifestyle preferences a long-term target. Further, in some embodiments, commitment data may be generated by evaluating interactions of the user with one or more external entities. In the context of a business, this evaluation may include extracting and processing data describing creditworthiness, including examining long-term and short-term spending patterns and repayment histories commensurate with those patterns. In the context of physical fitness, this evaluation may include observing gym attendance rates, caloric burn data, and weight training completion.

Alternatively, in other embodiments, the commitment datum may be extracted from a database including data describing various attributes of the user. In addition, in some embodiments, receiving the commitment datum extracted from the database includes using scripts, any one or more of which are configured to track data describing one or more activities of the user on the Internet. Also, receiving the commitment datum extracted from the database includes using data scrapers, which may be scrapers programmed to gather data describing the user from social media resources on the Internet.

In addition, in some embodiments, the memory configures the processor to identify a novelty datum as a function of the commitment datum using a machine-learning model including a classifier. As used herein, "a novelty datum" is any type of datum or data describing conception of a novel method, idea, product, and/or the like, as well as identification, incorporation and/or usage of tools, activities, educational workshops and other items or services that assisted the user achieve performance improvements related to attaining the enumerated target within the defined duration. In a business operational context, in some embodiments, the novelty datum may describe various internal changes within the organization. Such internal changes may include increased organizational structure, offering different services or products, a change in the existing services or products, management of resources, and the like.

Identification of the novelty datum may include using a machine-learning model to analyze the commitment datum by evaluating, as described by the commitment datum, a pattern of activity leading up to the user achievement of a target. Accordingly, processor may identify the novelty data from the pattern of activity that led to the achievement of a target.

The novelty datum describes indicators categorized into multiple categories. More particularly, each category relates to data describing a skill used by the user for matching the target as indicated by the novelty datum. The classifier correlates at least an element describing the pattern of the commitment datum to the target and generates a skill factor datum, which may include data describing obstacle traversal by the user. Also, in some instances, the classifier of the machine-learning model may classify at least the element describing the pattern of the commitment datum to matching the target between a minimum value and a maximum value. In some instances, the novelty datum includes data describing one or more activities completed by the user relating to the user matching the target and/or data describing changes in resource sharing for assisting the user match the target.

As used herein, commitment datum 108 is a part of "commitment data," defined as any data related to recent (e.g., within a defined duration, such as 3 consecutive months, 6 consecutive months, etc.) activity related to attaining an achievement-related target, or improvements in novelty made by the user. Alternatively put, commitment datum 108 describes a pattern that is representative of user activity progressing to match a target. That is, "commitment," as generally understood as the state or quality of being dedicated to a cause, activity, etc., can be represented by a datum, or data tracking or monitoring particular aspects of user behavior. In the context of fiscal responsibility for a bank, demonstration of "commitment," as used herein, is performing sufficient due diligence to accurately ascertain a potential customer's capability to routinely and timely repay outstanding loan obligations within a reasonable (e.g., market-standard, such as a 30-year loan term for a conventional residential mortgage product) term. Likewise, "commitment" may be demonstrated in other contexts as well, such as in the field of martial arts, where committed students may progress from one color rank belt to the next to ultimately reach one or more degrees of black belt status, depending on skill, speed, endurance, and other measurement variables. Consequently, commitment datum 108 describes such repeat behavior demonstrating commitment toward reaching such an enumerated goal, such as a certain volume of work-product output, educational attainment, debt reduction, etc.

As used herein, a "skill factor datum" (e.g., skill factor datum 116) is a datum or data describing the ability to use one's knowledge effectively and readily in execution or performance, dexterity, or coordination especially in the execution of learned physical tasks, or a learned power of doing something competently, such as a developed aptitude or ability. For example, skill factor datum 116 may describe certain skills in investment banking related careers, including intellect, discipline, creativity, open-mindedness, and/or relationship-building skills. Within these identified skills, there may be sub-skills, or skillsets, also capable of being identified and/or otherwise represented by skill factor datum 116.

In addition, skill factor datum 116, in one or more embodiments, may describe the "4Cs" for business, which, as used herein, are customers, costs, convenience and communication. That is, more particularly, skill factor datum 116, in the context of "customers," may describe customers in the context of the worth of their respective desired products or services, any relevant competitive advantages provided by some sellers, and the market positioning of those sellers. In addition, skill factor datum 116 may describe target customers, as well as potentially more than one target customer group, as well as the target customer's respective needs and desires, as well as market perception.

Further, skill factor datum 116, in the context of "costs," may describe considerations including affordability, satisfaction and value of goods and services sold by a given entity, such as a business, from a consumer's point of view, while also considering profitability. That is, skill in the context of cost can include considerations of how cost-efficiently goods and services are provided to consumers in a competitive marketplace. Skill may also include considerations of strategically addressing local, state, and federal tax implications.

In addition, skill factor datum 116, in the context of "communication," may describe how a given entity, such as a business, adeptly interacts, engages, or otherwise communicates with its respective customer base. Accordingly, skill factor datum 116, in this context, may describe information relating to customer benefits and social media usage rates for the deliberate development of products and services that customers are more likely to purchase.

Still further, skill factor datum 116, in the context of "convenience," may describe how a given entity, such as a business, adeptly navigates and traverses various purchasing barriers, such as by leveraging online sales and providing products through multiple outlet types.

More particularly, within the skill of "intellect," skill factor datum 116 may capture, indicate and/or otherwise represent capabilities of a candidate relating to achievements in data analytics, mathematics, finance, economics, as well as skills outside of these core competencies, such as intellectual curiosity. For example, intellectual curiosity may be assessed and represented by skill factor datum by observing candidate behavior regarding reading books related to the profession outside of working hours. Data regarding candidate reading behavior during their personal time may be captured by requesting the candidate to input data into display device 132 relating to reading behavior and comprehension, as evidenced by successfully answering or completing various forms of text and/or visual imagery-based quizzes or exams. In addition, in one or more embodiments, the skill factor datum may be used with novelty datum and include an identification of the skill. In addition, in some embodiments, the skill factor datum may additionally be an evaluation of the improvement and/or acquisition of the skill that facilitated the user traversing an obstacle toward reaching the target. Alternatively, in some other embodiments, the skill factor datum may also describe data relating to the user progressing toward achieving the target as indicated by, for example, at least the novelty datum.

In some embodiments, a skill factor may include a "skill improvement datum," which is datum or data relating to providing the user with tips, exercises, and instructions on how to improve a skill factor. In addition, once a skill improvement datum is implemented by the user, the commitment datum may be iteratively revaluated. That is, for example, should the user input a target of running a mile within 7 minutes, described processes may evaluate the commitment of the user in attaining this target as shown by runs completed during the week, each run at varying intensity and/or speed. Should the user demonstrate marked improvement, such as by decreasing a total elapsed time to complete the run from 9 minutes to 7 minutes over the course of 3 months, described processes may recommend a faster pace, such as a 6:15 total elapsed mile run time. Conversely, should the user fail to demonstrate expected improvement, such as by either not decreasing the elapsed time overall or by decreasing elapsed time by an insignificant amount, then described processes may recommend a more gradual training program. In addition, such performance monitoring may also be considered to evaluate altering or iteratively updating one or more instances of the novelty datum, such as recommending a change in gait for the runner, in the context of the described running example.

In addition, in one or more embodiments, generating a skill factor as a function of the novelty datum may include assessing a category of each skill the user used to achieve the improvement as indicated by the novelty datum. The skill factor may be classified to the novelty datum using a classifier of a machine-learning model. Further, the skill factor may be aggregated based on classification to produce more accurate results, e.g., to output a customized skill factor for the user to attain the target. For example, when two or more skill factors are classified to a novelty datum, the entirety or a sub-set of these skill factors may be displayed to the user based on classification. That is, returning to the described example of the runner, skill factors such as calf strength gained by running uphill, neutral pronation, and/or steady breathing, etc., may be aggregated based on conceptual relation to each other. For example, both calf strength and neutral pronation relate to the legs and feet, whereas breathing techniques relate more to the respiratory system. As a result, skill factors relating to calf strength and neutral pronation may be aggregated under a general category or indicator of "leg training," etc.

In addition, in one or more embodiments, the memory configures the processor to refine the skill factor datum as a function of the novelty datum. The skill factor datum is classified by the classifier to the novelty datum and aggregated with additional instances of the skill factor datum based on classification. Any one or more instances of the skill factor datum includes descriptions relating to acquisition of the skill, and descriptions of a frequency of implementation of the skill by the user correlated to the target. In addition, the memory configures the processor to generate an "interface query data structure" including an input field based on aggregations of the skill factor datum. An "interface query data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

Therefore, "interface query data structure," as used herein, refers to, for example, a data organization format used to digitally request a data result or action on the data. In addition, the "interface query data structure" can be displayed on a display device, such as a digital peripheral, smartphone, or other similar device, etc. The interface query data structure may be generated based on received "user data," defined as including historical data of the user. Historical data may include attributes and facts about a user that are already publicly known or otherwise available, such as quarterly earnings for publicly traded businesses, etc. In some embodiments, interface query data structure prompts may be generated by a machine-learning model. As a non-limiting example, the machine-learning model may receive user data and output interface query data structure questions. Accordingly, the interface query data structure configures a remote display device to display the input field to the user and receive at least a user-input datum into the input field. The user-input datum includes data for selecting a preferred attribute of any one or more skills associated with one or more instances of the skill factor datum. In addition, in some instances, the user-input datum may be evaluated by using a classifier for classifying the user-input datum with at least some instances of the skill factor datum.

Referring now to FIG. 1, an exemplary embodiment of apparatus 100A for providing a customized skill factor datum to a user. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive at least an element of commitment datum 108, which may include data describing current preferences relating to achieving a target by the user. For the purpose of this disclosure, a "commitment datum" is an element, datum, or elements of data describing historical data of performance of a user, such as any data related to achievements and/or improvements made by the user relating to attaining defined goal, identified by target datum 118 (to be explained in further detail below). In some embodiments, commitment datum 108 may be input into computing device 104 manually by the user, who may be associated with any type or form of establishment (e.g., a business, university, non-profit, charity, etc.), or may be an independent entity (e.g., a solo proprietor, an athlete, an artist, etc.). In some instances, commitment datum 108 may be extracted from a business profile, such as that may be available via the Internet on LinkedIn®, a business and employment-focused social media platform that works through websites and mobile apps owned my Microsoft® Corp., of Redmond, WA). More particularly, such a business profile may include the past achievements of a user in various fields such as business, finance, and personal, depending on one or more particular related circumstances. Persons skilled in the art, upon reviewing the entirety of this disclosure, will be aware of various other ways or situations in which commitment datum 108 may be input, generated, or extracted for various situations and goals. For example, in an example where the user is a business, commitment datum 108 may be extracted from or otherwise be based on the user's business profile, which may include various business records such as financial records, inventory record, sales records, and the like. In addition, in one or more embodiments, commitment datum 108 may be generated by evaluating interactions with external entities, such as third parties. More particularly, in a business-related context, such an example external entity (or third party) may be that offered by Moody's Investors Services, Inc., Moody's Analytics, Inc. and/or their respective affiliates and licensors, of New York, NY. Services rendered may include providing international financial research on bonds issued by commercial and government entities, including ranking the creditworthiness of borrowers using a standardized ratings scale which measures expected investor loss in the event of default. In such an example, commitment datum 108 extracted from such an external entity may include ratings for debt securities in several bond market segments, including government, municipal and corporate bonds, as well as various managed investments such as money market funds and fixed-income funds and financial institutions including banks and non-bank finance companies and asset classes in structured finance. In addition, or the alternative, in one or more embodiments, commitment datum 108 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, commitment datum 108 may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation). For example, for classifying at least an element describing a pattern of commitment datum 108 (e.g., of a business) to target datum 118 in the context of fiscal integrity in financial services and retirement planning, commitment datum 108 may equal "3" for a business, such as an investment bank stock or mutual fund share, etc., suffering from credit liquidity problems stemming from a rapidly deteriorating macroeconomic environment and/or poor quality senior management, a "5" for only matching industry peers, and an "8" for significantly outperforming industry peers, etc.

Other example values are possible along with other exemplary attributes and facts about an entity that are already known and may be tailored to a particular situation where explicit business guidance (e.g., provided by the described progression sequence) is sought. In one or more alternative embodiments, commitment datum 108 may be described by data organized in or represented by lattices, grids, vectors, etc. and may be adjusted or selected as necessary to accommodate particular entity-defined circumstances or any other format or structure for use as a calculative value that a person skilled in the art would recognize as suitable upon review of the entirety of this disclosure.

In one or more embodiments, commitment datum 108 may be provided to or received by computing device 104 using various means. In one or more embodiments, commitment datum 108 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human may manually enter commitment datum 108 into computing device 104 using, for example, user input field 148 of graphical user interface (GUI) 136 of display device 132. For example, and without limitation, a human may use display device 132 to navigate the GUI 136 and provide commitment datum 108 to computing device 104. Non-limiting exemplary input devices include keyboards, joy sticks, light pens, tracker balls, scanners, tablet, microphones, mouses, switches, buttons, sliders, touchscreens, and the like. In other embodiments, commitment datum 108 may be provided to computing device 104 by a database over a network from, for example, a network-based platform. Commitment datum 108 may be stored, in one or more embodiments, in database 150 and communicated to computing device 104 upon a retrieval request from a human and/or other digital device (not shown in FIG. 1) communicatively connected with computing device 104. In other embodiments, commitment datum 108 may be communicated from a third-party application, such as from a third-party application on a third-party server, using a network. For example, commitment datum 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract commitment datum 108 from an accumulation of information provided by database 150. For instance, and without limitation, computing device 104 may extract needed information database 150 regarding improvement in a particular area sought-after by the business and avoid taking any information determined to be unnecessary. This may be performed by computing device 104 using a machine-learning model, which is described in this disclosure further below.

At a high level, "a machine-learning" describes a field of inquiry devoted to understanding and building methods that "learn"—that is, methods that leverage data to improve performance on some set of defined tasks. Machine-learning algorithms may build a machine-learning model based on sample data, known as "training data", to make predictions or decisions without being explicitly programmed to do so. Such algorithms may function by making data-driven predictions or decisions by building a mathematical model from input data. These input data used to build the machine-learning model may be divided in multiple data sets. In one or more embodiments, three data sets may be used in different stages of the creation of the machine-learning model: training, validation, and test sets.

Described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attributes 154 relating to particular attributes of the user. In the described example of a business, such as a retail, regional, or even investment banks, user attributes may include data describing liquidity available to customers and performance of outstanding loans and other products. In addition, commitment datum 108 may include data describing a pattern of activity or conduct undertaken by the user regarding improvement of their performance. In banking, that may mean reducing risk exposure in relatively difficult macroeconomic conditions as dictated by higher-than-average federal interest rates, etc.

In addition, in one or more embodiments, computing device 104 is configured to receive at least an element of novelty datum 112. For the purpose of this disclosure, a "novelty datum" is an element, datum, or elements of data describing any activity, process, tool, equipment, etc., that assisted the user in progressing toward achieving target datum 118. For example, such activities may include implementing additional organizational structure, offering different services or products reflective of ongoing changes in customer preferences, or other changes in existing services or products, management of resources, and the like. More particularly, in some instances, the "novelty datum" may be alternatively referred to as an "innovation datum" and thereby also be based on data describing practical implementation of ideas that result in the introduction of new goods or services or improvement in offering goods or services. Identification of novelty datum 112 may use a machine-learning model to analyze, for example, a pattern demonstrated by the user regarding achieving target datum 118, as also indicated by commitment datum 108. Alternatively put, commitment datum 108 may indicate a pattern of activity that leads up to the user's achievement of target datum 118. Accordingly, processor 144 may identify novelty datum 112 from data describing any pattern of activity that led to the user's achievement of target datum 118.

In addition, in one or more embodiments, computing device 104 is configured to receive at least an element of skill factor datum 116. For the purpose of this disclosure, a "skill factor datum" is an element, datum, or elements of data describing the learned ability to act with determined results with good execution, such as within a given or otherwise limited amount of time, energy, and/or effort. More particularly, skills can be divided into domain-general and domain-specific skills. For example, in the domain of work (e.g., productive employment), some general skills may include time management, teamwork and leadership, self-motivation and others, whereas domain-specific skills would be used only for a certain job, such as practicing as a physician or as an attorney. In some embodiments, skill may require deployment in certain environmental stimuli and situations to assess the level of skill being shown and used. Further, a skill may be called an "art" when it represents a body of knowledge or branch of learning, as in the "art of medicine" or the "art of war." Although the arts are also skills, there are many skills that form an "art" as so described here but have no subject matter connection to the fine and/or performing arts.

More particularly, skill factor datum 116 may be generated by computing device 104 (as to be further described below) as a function of novelty datum 112. In the context of banking, an example skill or qualification of a loan officer may be or include financial, time management, software, customer service, thoroughness, and analytical skills. In this example, skill factor datum 116 may be a skill that allowed the user to achieve novelty datum 112 and may include an identification of the skill and/or an evaluation of the improvement/acquisition of the skill that prompted the user to overcome an obstacle and achieve the improvement as indicated by novelty datum 112. In the context of banking in challenging macroeconomic circumstances as dictated by higher-than-expected federal interest rates, skill factor datum 116 may be the skill of a loan officer in adeptly identifying risky borrowers to reject their loan applications to thereby, because of the rejection initiated by the loan officer, improve overall performance of the bank.

In addition, in one or more embodiments, skill factor datum 116 may include or describe a skill improvement datum (not shown in FIG. 1), which may include data describing providing the user with various tips, exercises, and instructions on how to improve skill factor datum 116. For example, returning to the context of a loan officer of a bank, a suitable skill improvement datum may describe educational activities undertaken by the loan officer to improve their analytical and/or decision-making skills to identify key positive or negative indicators demonstrated by loan applicants to approve of only quality applicants capable of timely repaying their respective outstanding loan obligations.

More particularly, in some embodiments, generating skill factor datum 116 as a function of novelty datum 112 may include digitally assessing one or more categories of each skill the user used to achieve various performance-related improvement as indicated by novelty datum 112. In addition, one or more instances of skill factor datum 116 may be classified, by classifier 124 of machine-learning module 120 executed by processor 144, to novelty datum 112. Further, in some embodiments, skill factor datum 116 may be aggregated based on classification by classifier 124 to produce "better results" for the user, where "better results" are used herein and defined as identification of one or more instances of skill factor datum 116 that more closely and/or accurately present skills related to the user efficiently achieving target datum 118. In addition, in one or more embodiments, when multiple (e.g., two or more) skill factors are classified by classifier 124 to novelty datum 112, described processes may result in the selection and presentation to the user of multiple instances of skill factor datum 116 based on the classification.

Still further, in one or more embodiments, skill factor datum 116 may describe one or more elements, datum, or data describing confidence levels of the user. "Confidence," as used herein, is defined as a state of having complete mental clarity relating to that a hypothesis or prediction is correct, or that a chosen course of action is the best or most effective in a given scenario or circumstance. Accordingly, "self-confidence," as used herein, is defined as having trust in one's self—to, for example, successfully complete a work assignment on time, or to progress in physical training by achieving new milestones on an as-expected basis, with commensurate adjustments and improvements to eat only a healthy and "clean" diet, with limited to no processed foods and/or refined sugars, etc. Confidence, therefore, can impact the user's ability to favorably respond to social influences, as to be described further below.

For example, an individual's self-confidence can vary in different environments, such as at home or in school, and with respect to different types of relationships and situations. In relation to general society, some have found that the more self-confident an individual is, the less likely they are to conform to the judgments of others. Other studies indicate that self-confidence in an individual's ability may only rise or fall where that individual is able to compare themselves to others who are roughly similar in a competitive environment. Furthermore, when individuals with low self-confidence receive feedback from others, they are averse to receiving information about their relative ability and negative informative feedback, yet still not averse to receiving positive feedback.

Aspects of the present disclosure recognize that, in some instances, people with relatively high self-confidence can more easily impress others, as others perceive them as more knowledgeable and more likely to make correct judgments. Accordingly, skill factor datum 116 can include or otherwise describe data representing at least the various above-described forms of confidence and/or self-confidence. For example, confidence may be demonstrated by a user attending a conference, or by delivering a keynote address at that conference. Different attributes may be correlated to each of those tasks—that is, attending the conference may be represented by data describing a relatively lower confidence level, whereas delivering the keynote address may be represented by data describing a relatively higher confidence level.

Accordingly, concepts relating to confidence can be quantified by one or more elements, datum or data and thereby processed by "machine-learning processes" executed by machine-learning module 120 of computing device 104 to, for example, be evaluated prior to display of multiple instances of skill factor datum 116 (e.g., the first skill factor datum and at least the second skill factor datum) hierarchically based on user-input datum 224A in user input field 148. More particularly, and as described further herein with relation to FIG. 4, a "machine-learning process," as used in this disclosure, is a process that automatedly uses training data to generate an algorithm that will be performed by a computing device/module (e.g., computing device 104 of FIG. 1) to produce outputs given data provided as inputs. Any machine-learning process described in this disclosure may be executed by machine learning module 120 of computing device 104 to manipulate and/or process skill factor datum 116 relating to describing instances or characteristics of confidence for the user.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in a given data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of skill factor datum 116 describing confidence of a user as described above as inputs. Accordingly, computing device 104 of FIG. 1 may receive user-input datum 224A into input field 148 of display device 132. User-input datum 224A may describe data for selecting a preferred attribute (e.g., such data describing "not always seeking approval from others," "decisiveness," "assertiveness," "perseverance," or other unique attributes of confidence, etc.) of any one or more skills associated with one or more instances of aggregated first skill factor datum (e.g., an instance of skill factor datum 116) and at least the second skill factor datum (e.g., another instance of skill factor datum 116). Classifier 124 of machine learning module 120 may classify such data relative to, for example, target datum 118 (e.g., also in the context of confidence, such as achieving an optimum confidence level). Accordingly, in some embodiments, classifier 124 may classify instances of skill factor datum 116 that more closely relate to or resemble target datum 118 within a closer proximity to target datum 118.

That is, for example, should target datum 118 describe the user deliver a keynote address in front of a large audience at a university graduation commencement ceremony, then classifier 124 may classify instances of skill factor 116 that more closely resemble target datum 118 closer to that particular instance of target datum 118. Examples of skill factor datum 116 include data describing the user delivering preparatory speeches in front of friends or data describing delivering practice speeches in front a mirror. In this example, classifier 124 may classify data describing delivering preparatory speeches in front of friends closer to target datum 118, given the relatively higher similarity of that task to target datum 118. Therefore, in some instances, described interface query data structures may configure display device 132 to display the first skill factor datum and at least the second skill factor datum hierarchically based on (e.g., conceptual similarity relative to) user-input datum 224A. That is, the hierarchical display of the first skill factor datum and at least the second skill factor datum are outputs responsive to at least the described training data being input into described machine-learning processes.

In this way, a scoring function representing a desired form of relationship to be detected between inputs and outputs may be used by described machine learning processes. Such as scoring function may, for instance, seek to maximize the probability that a given input (e.g., data describing perseverance relating to confidence) and/or combination of elements and/or inputs (e.g., data describing confidence overall) is associated with a given output (e.g., hierarchical display of multiple instances of skill factor datum 116 describing confidence) to minimize the probability that a given input (e.g., data describing potential over-confidence or recklessness) is not associated with a given output (e.g., additional stimuli encouraging confident or borderline reckless behavior).

In addition, or the alternative, skill factor datum 116 can include or describe one or more elements, datum, or data relating to courage. "Courage," as used herein, is defined as the choice and willingness to confront agony, pain, danger, uncertainty, or intimidation, in various circumstances ranging from business, interpersonal or romantic relationship, or combat. "Valor," as used herein, is defined as courage or bravery, especially in battle. "Fortitude," as used herein, is used interchangeably with "courage," but also includes aspects of both perseverance and patience. Aspects of the present disclosure recognize that any one or more of courage, valor, and/or fortitude may be identified and tracked by one or more elements, datum, or data and thereby included or described by skill factor 116. For example, military service members may demonstrate great courage in infiltrating enemy lines in clear and present danger to their own lives and physical and mental well-being. Such traits of conduct can be tracked by service member response to military deployments and battle tactics. Consequently, skill factor datum 116 may be generated from data describing one or more of courage, valor and/or fortitude may by using machine-learning processes executed by machine-learning module 120 of computing device 104 and thereby be evaluated prior to display of multiple instances of skill factor datum 116 (e.g., the first skill factor datum and at least the second skill factor datum) hierarchically based on user-input datum 224A in user input field 148.

Similar to that discussed for usage of machine-learning processes to intake data describing user confidence levels, such machine learning processes may in addition, or the alternative, intake data describing user courage, valor, or fortitude levels to correspondingly output multiple instances of skill factor datum 116 in a hierarchical format as relating to described aspects of courage. More particularly, in one or more embodiments, a supervised learning algorithm (or any other machine-learning algorithm described herein) may include one or more instances of skill factor datum 116 describing courage of a user as described above as inputs. Accordingly, computing device 104 of FIG. 1 may receive user-input datum 224A into input field 148 of display device 132. User-input datum 224A may describe data for selecting a preferred attribute (e.g., such data describing "willingness to confront difficult problems," "setting a bold vision for the future," "trustworthiness," "endurance," or other unique attributes of courage, etc.) of any one or more skills associated with one or more instances of aggregated first skill factor datum (e.g., an instance of skill factor datum 116) and at least the second skill factor datum (e.g., another instance of skill factor datum 116). Classifier 124 of machine learning module 120 may classify such data relative to, for example, target datum 118 (e.g., also in the context of courage, such as achieving an optimum confidence level). Accordingly, in some embodiments, classifier 124 may classify instances of skill factor datum 116 that more closely relate to or resemble target datum 118 within a closer proximity to target datum 118.

That is, for example, should target datum 118 describe the user carefully planning the surgical assault of an enemy stronghold while minimizing civilian and non-belligerent combatant casualties, then classifier 124 may classify instances of skill factor 116 that more closely resemble target datum 118 closer to that particular instance of target datum 118. Examples of skill factor datum 116 include data describing the user planning a tactical assault or data describing launching a long-term siege. In this example, classifier 124 may classify data describing planning a tactical assault closer to target datum 118, given the relatively higher similarity of that task to target datum 118. Therefore, in some instances, described interface query data structures may configure display device 132 to display the first skill factor datum and at least the second skill factor datum hierarchically based on (e.g., conceptual similarity relative to) user-input datum 224A. That is, the hierarchical display of the first skill factor datum and at least the second skill factor datum are outputs responsive to at least the described training data being input into described machine-learning processes.

In addition, in one or more embodiments, computing device 104 is configured to receive at least an element of target datum 118. For the purpose of this disclosure, a "target datum" is an element, datum, or elements of data describing goal or object, either short or long term, desired for achievement by the user. In a non-limiting example, target datum 118 as described herein may be substantially the same as growth data and/or growth constraint profiles as used for higher-order growth modeling as described in U.S. patent application Ser. No. 18/141,725, filed on May 1, 2023, titled "APPARATUS AND A METHOD FOR HIGHER-ORDER GROWTH MODELING," which is incorporated herein by reference herein in its entirety.

In some instances, a goal may be or include an idea of the future or desired result that a person or a group of people envision, plan, and commit to achieve. In a professional or career-oriented context, goals can include milestones intended for achievement during the user's career, such as being invited to become an equity shareholder at a professional services firm, such as a law firm or an accounting firm, etc., or may include career changes or redirections, increases in salaries, or increases in supervisory expectations, such as having direct reporting personnel, etc. Other specific examples of goals, targets, or other forms of achievement suitable for identification or tracking by target datum 118 include marked increases in core skills, such as in particular field of study, such as chemistry, chemical engineering, physics, astronomy, etc. Still further, target datum 118 may describe data relating to performance in interpersonal relationships, such as meeting new friends through activity groups, or increase romantic dating exposure by satisfactorily communicating key criteria, such as identify verification, etc. In some embodiments, the user (e.g., which may be just one person, or multiple persons organized into one or more groups of people) may endeavor to reach goals within a finite time by setting deadlines. Consequently, target datum 118 may, in some instances, include data describing a goal, which may be generally to a purpose or aim, the anticipated result which guides reaction, or an end, which is an object, either a physical object or an abstract object, that has intrinsic value.

Still referring to FIG. 1, in one or more embodiments, apparatus 100 for providing a skill factor hierarchy to a user is described. Apparatus 100 includes at least processor 144 and memory component 140 connected to the processor. The memory contains instructions configuring processor 144 to receive commitment datum 108 describing a pattern that is representative of user activity progressing to match target datum 118, identify novelty datum 112 as a function of commitment datum 108 and identify a first skill factor datum (e.g., one instance of skill factor datum 116) as a function of the novelty datum. Refining the first skill factor datum further includes classifying novelty datum 112 to the first skill factor datum and aggregating the first skill factor datum with at least a second skill factor (e.g., another instance of skill factor datum 116) datum based on the classification. In addition, either skill factor datum further includes data describing an obstacle traversal by the user.

In addition, memory component 140 contains instructions configuring processor 144 to generate an interface query data structure including user input field 148 based on aggregations of skill factor datum 116. The interface query data structure configures display device 132 to display user input field 148 to the user and receive at least user-input datum 224A into the input field. The user-input datum 224A describes data for selecting a preferred attribute of any one or more skills associated with one or more instances of the aggregated first skill factor datum and at least the second skill factor datum and display the first skill factor and at least the second skill factor datum hierarchically based on user-input datum 224A.

In one or more embodiments, generating the interface query data structure further includes retrieving data describing attributes of the user from the database and generating the interface query data structure based on the data describing attributes of the user. In addition, or in the alternative, in some embodiments, generating commitment datum 108 further includes retrieving data describing current preferences of the user between a minimum value and a maximum value from the database and generating the interface query data structure based on the data describing current preferences of the user.

Further, in some instances, receiving commitment datum 108 further includes extracting commitment datum 108 from the database using scripts. In addition, or in the alternative, extracting commitment datum 108 from the database further includes tracking data describing one or more activities of the user on the Internet. Still further, in some embodiments, receiving commitment datum 108 includes receiving commitment datum 108 using data scrapers and/or evaluating data derived from external entities.

In some embodiments, novelty datum 112 includes data describing one or more activities completed by the user, where the one or more activities relate to the user matching the target. In addition, in one or more instances, novelty datum 112 includes data describing changes in resource sharing for the user matching the target.

In one or more embodiments, processor 144 may be configured to evaluate user-input datum 224A by using a feedback loop, which is defined as using the classifier for classifying one or more new instances of user-input datum 224A with the first skill factor datum and the second skill factor datum. The feedback loop includes generating a consecutive skill factor datum based on the classification and displaying the first skill factor, the second skill factor datum, and at least the consecutive skill factor datum hierarchically based on the classification of the consecutive skill factor datum to one or more new instances of the user-input datum.

In some instances, classifying novelty datum 112 to at least the first skill factor datum further includes aggregating the first skill factor datum with at least a second skill factor datum based on the classification and further classifying aggregated data to data describing a frequency of implementation of the first skill factor datum and the second skill factor datum to the target. In addition, in some embodiments, the interface query data structure further configures display device 132 to provide an articulated graphical display including multiple regions organized in a tree structure format, where each region provides one or more instances of point of interaction between the user and the remote display device.

In addition, in one or more embodiments, classifier 124 may classify and/or correlate only a select portion of one or more instances of any one or more of commitment datum 108, novelty datum 112, skill factor datum 116, and/or target datum 118 (e.g., which may be user-defined and input into computing device 104 through interaction with user input field 148 of display device 132) with data describing at least some user attributes 154 and/or instances of external entity interaction datum. More particularly, the described processes do not always require that all occurrences of each described datum are classified and/or correlated with user attributes 154 and/or instances of external entity interaction datum 158. For example, described processes may classify or correlate select portions of occurrences of commitment datum 108 and/or novelty datum 112 with select portions of user attributes 154. In addition, each occurrence of user attributes 154 may not have a corresponding commitment datum 112.

For example, certain user attributes may be deemed not particularly relevant to commitment datum 108 to thereby not have a corresponding instance attribute within user attributes 154. As a result, such, as well as other forms of, data may "train" described machine-learning processes to iteratively refine described data and provide a customized skill factor datum to a user in a particular operational condition.

In one or more embodiments, processor 144 of computing device 104 may be configured to execute described machine-learning processes by machine-learning module 120 to generate or populate training data, which may include requesting a human or a computer (not shown in FIG. 1) communicatively connected to computing device 104 to input data describing a pattern that is representative of user activity progressing to match target datum 118 through user input field 148 of GUI 136 of display device 132. Human or computer-provided input may be binary in certain circumstance, e.g., a "yes" or "no," or include phrases or sentences provided in text format that the described machine-learning processes may recognize using text-recognition or another applicable data processing technique. Human or computer-provided responses may be incorporated into user attributes 154 to be later iteratively correlated by relative applicability to, for example, the business and be potentially used with external entity interaction datum 158 to provide the customized skill factor datum as described.

After initial training, machine-learning processes (to be described in further detail below) may classify one or more instances of any one or more of commitment datum 108, novelty datum 112, skill factor datum 116, and/or target datum 118 to user attributes 154 and/or external entity interaction datum 158 to provide the customized skill factor datum to the user.

In one or more embodiments, database 150 may include inputted or calculated information and data (e.g., data related to one or more instances of any one or more of commitment datum 108, novelty datum 112, skill factor datum 116, and/or target datum 118, as well as user attributes 154 and/or external entity interaction datum 158) related to providing the customized skill factor datum to the user. In addition, a datum history may be stored in a database 150. Datum history may include real-time and/or previously inputted to one or more instances of any one or more of commitment datum 108, novelty datum 112, skill factor datum 116, and/or target datum 118. In one or more embodiments, database 150 may include real-time or previously determined record recommendations and/or previously provided interaction preparations. Computing device 104 may be communicatively connected with database 150.

For example, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "finance" in the instance that a business is seeking to optimize operations in the financial services and/or retirement industry. In another non-limiting example, keywords of a key-phrase may be "luxury vehicle manufacturing" in an example where the business is seeking to optimize market share internationally, or certain rapidly developing markets. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, computing device 104 is further configured to receive commitment datum 108, as previously mentioned. For the purposes of this disclosure, "entity datum" includes historical data of the entity. Historical data may include attributes and facts about a user already known, such as current inventory, total revenue, profit and loss, payroll information, transportation costs, operational costs, such as rent, utility bills, insurance rates, and the like. Commitment datum 108 may describe textual, audio and/or visual information related to the entity's operational information or attributes. In some embodiments, user attributes 154 and/or commitment datum 108 may describe textual, audio and/or visual information relating to the user demonstrating commitment through systematic completion of activities related to achieving target datum 118. User attributes 154 may be received by computing device 104A by identical or similar means described above for commitment datum 108 and/or novelty datum 112. For example, and without limitation, user attributes 154 may be provided to computing device 104 by a human or computer (not shown in FIG. 1) communicatively connected with computing device 104 through, for example, a third-party application, remote device, immutable sequential listing, etc.

A "classifier," as used in this disclosure is type or operational sub-unit of any described machine-learning model or process executed by machine-learning module 120, such as a mathematical model, neural net, or program generated by a machine-learning algorithm known as a "classification algorithm" that distributes inputs into categories or bins of data, outputting the categories or bins of data and/or labels associated therewith. A classifier may be configured to classify and/or output at least a datum (e.g., one or more instances of any one or more of commitment datum 108, novelty datum 112, skill factor datum 116, and/or target datum 118 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 124 to classify one or more instances of any one or more of commitment datum 108, novelty datum 112, skill factor datum 116, and/or target datum 118 based on user attributes 154 and/or external entity interaction datum 158. Accordingly, classifier 124 of machine-learning module 120 may classify attributes within user attributes 154 related to demonstrating commitment toward reaching target datum 118 for providing the customized skill factor datum to the user.

In addition, in some embodiments, machine-learning module 120 performing the described correlations may be supervised. Alternatively, in other embodiments, machine-learning module 120 performing the described correlations may be unsupervised. In addition, classifier 124 may label various data (e.g., one or more instances of any one or more of commitment datum 108, novelty datum 112, skill factor datum 116, and/or target datum 118 as well as other elements of data produced, stored, categorized, aggregated, or otherwise manipulated by the described processes) using machine-learning module 120. For example, machine-learning module 120 may label certain relevant parameters of one or more instances of commitment datum 108 with parameters of one or more user attributes 154. In addition, machine-learning processes performed by machine-learning module 120 may be trained using one or more instances of external entity interaction datum 158 to, for example, more heavily weigh or consider instances of external entity interaction datum 158 deemed to be more relevant to the business. More specifically, in one or more embodiments, external entity interaction datum 158 may be based on or include correlations of parameters associated with commitment datum 108 to parameters of user attributes 154. In addition, external entity interaction datum 158 may be at least partially based on earlier iterations of machine-learning processes executed by machine-learning module 120. In some instances, running machine-learning module 120 over multiple iterations refines correlation of parameters or data describing entity operations (e.g., associated with commitment datum 108) with parameters describing at least user attributes 154.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figures 2A, 2B:
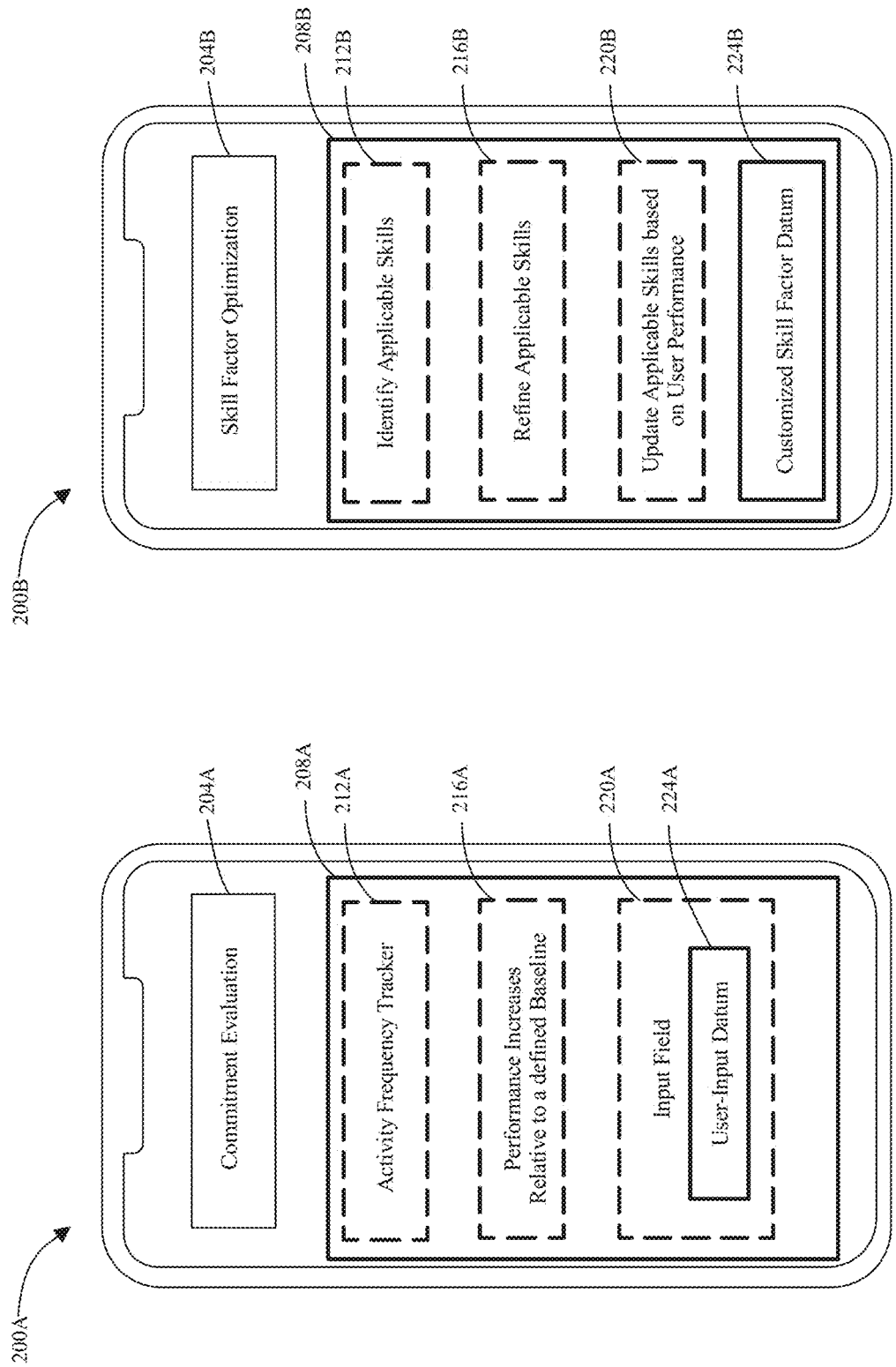
FIGS. 2A-2B are diagrammatic representations of multiple exemplary embodiments of output generated by an interface query data structure.

Referring now to FIGS. 2A-2B, exemplary embodiments of user input field 148 as configured to be displayed by GUI 136 of display device 132 based on an interface query data structure are illustrated. As defined earlier, an "interface query data structure" refers to, for example, a data organization format used to digitally request a data result or action on the data (e.g., stored in a database). In one or more embodiments, each output screen 200A-200B may be an example of an output screen configured to be displayed by display device 128 of FIG. 1 by an interface query data structure. That is, more particularly, interface query data structure 112A may configure display device 128 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 148 and/or GUI 136 as displayed by display device 132, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including identification field 204A, activity frequency tracker field 212A, performance monitoring field 216A, user-input field 220A, which may include one or more instances of user-input datum 224A describing data for selecting a preferred attribute of any one or more skills associated with one or more instances of the skill factor datum. In addition, in one or more embodiments, user input datum 224A may be reflective of and/or provide a basis for user attributes 154. Persons skilled in the art, upon reviewing the entirety of this disclosure, will be aware of various ways in which fewer or additional interactive user input fields may be displayed by screen 208A. Identification field 204A may identify described processes performed by processor 144 of computing device 104 by displaying identifying indicia, such as "Commitment Evaluation" as shown in FIG. 2A to permit, for example, a human to interact with GUI 136 and input information relating to a field of choice (e.g., business operations), through (for example) interactivity provided by identification field 204A.

Such information can include data describing activities performed by the business relating to the business achieving its defined goal (e.g., target datum 118 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, activity frequency tracker field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 120 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Skill Factor Optimization" in identification field 204B as indicating completion of intake of human-provided input and that described machine-learning processes have completed described classifying processes to output customized skill factor assessment area 208B to the user. For example, in one or more embodiments, customized skill factor assessment area 208B may also include multiple human-interactive fields, including skill identification field 212B, skill refinement field 216B, a skill update field 220B, and customized skill factor datum 224B generated as described earlier.

Persons skilled in the art, upon reviewing the entirety of this disclosure, will be aware of various ways in which fewer or additional interactive human input fields may be displayed by output screen 200B. Each field within customized skill factor assessment area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in customized skill factor assessment area 208B, but persons skilled in the art will be aware of other example types of feedback, each of which being generated as suitable for a given business by processor 144. In addition, in one or more embodiments, any one or more fields of customized skill factor assessment area 208B may be human-interactive, such as by posing a query for the human to provide feedback in the form of input such that described machine-learning processes performed by machine-learning module 120 may intake refined input data and correspondingly process related data and provide an updated customized skill factor assessment area 208B. In some embodiments, such processes may be performed iteratively, thereby allowing for ongoing refinement, redirection, and optimization of customized skill factor assessment area 208B to better meet the needs of the business.

Figure 3:
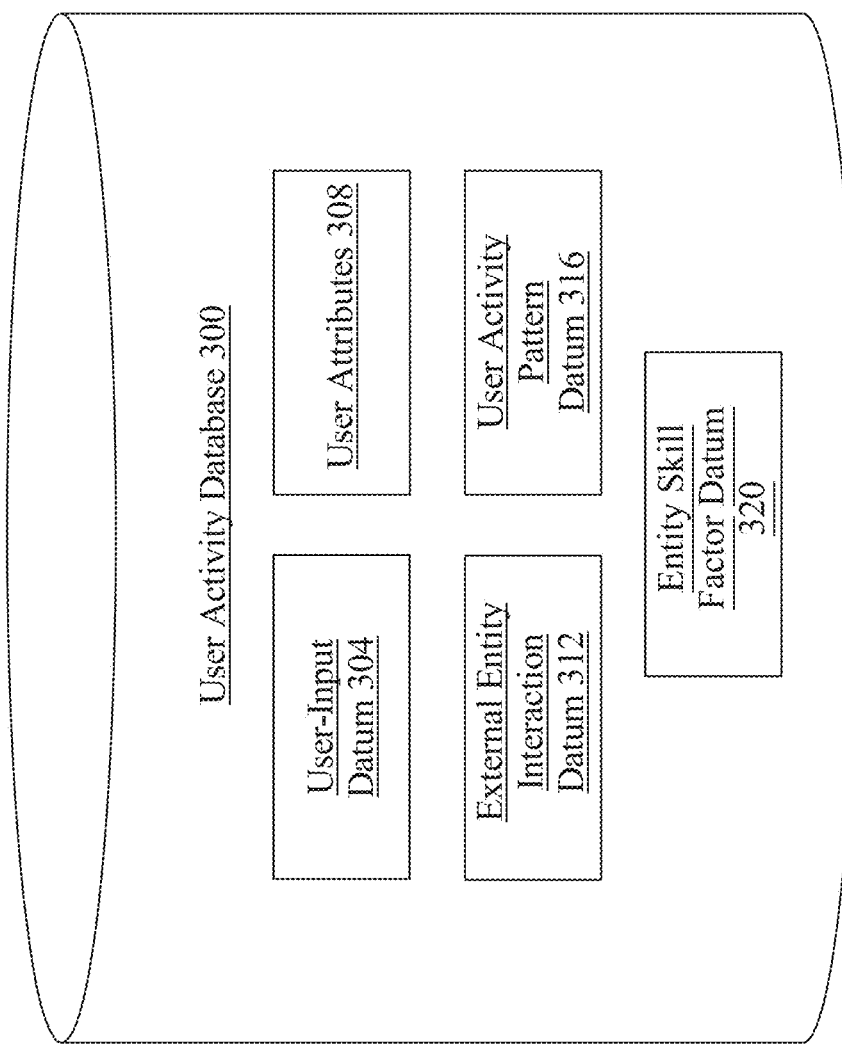
FIG. 3 is a diagrammatic representation of a query database.

Referring now to FIG. 3, an exemplary embodiment of user activity database 300 is illustrated. In one or more embodiments, user activity database 300 may be an example of database 150 of FIG. 1. Query database may, as a non-limiting example, organize data stored in the user activity database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface query data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attributes categorized in multiple tables from user activity database 300. For example, as shown in FIG. 3, user activity database 300 may be generated with multiple categories including user-input datum 304, user attributes 308, external entity interaction datum 312, user activity pattern datum 316 and entity skill factor datum 320, which describes various aspects of the "4Cs," referring to customers, costs, convenience, and communication, of long-term business planning as introduced earlier. Consequently, described processes may receive user-input datum 304 into user input field 148 of FIG. 1, where the user-input datum may describe data for selecting a preferred attribute of any one or more skills associated with one or more instances of skill factor datum 116. In addition, described processes may retrieve data describing additional attributes related to the preferred attribute of skill factor datum 116 from user activity database 300 connected with the processor based on user-input datum 304 (e.g., or, alternatively, one or more of user attributes 308, external entity interaction datum 312, and/or user activity pattern datum 316, etc.).

Figure 4:
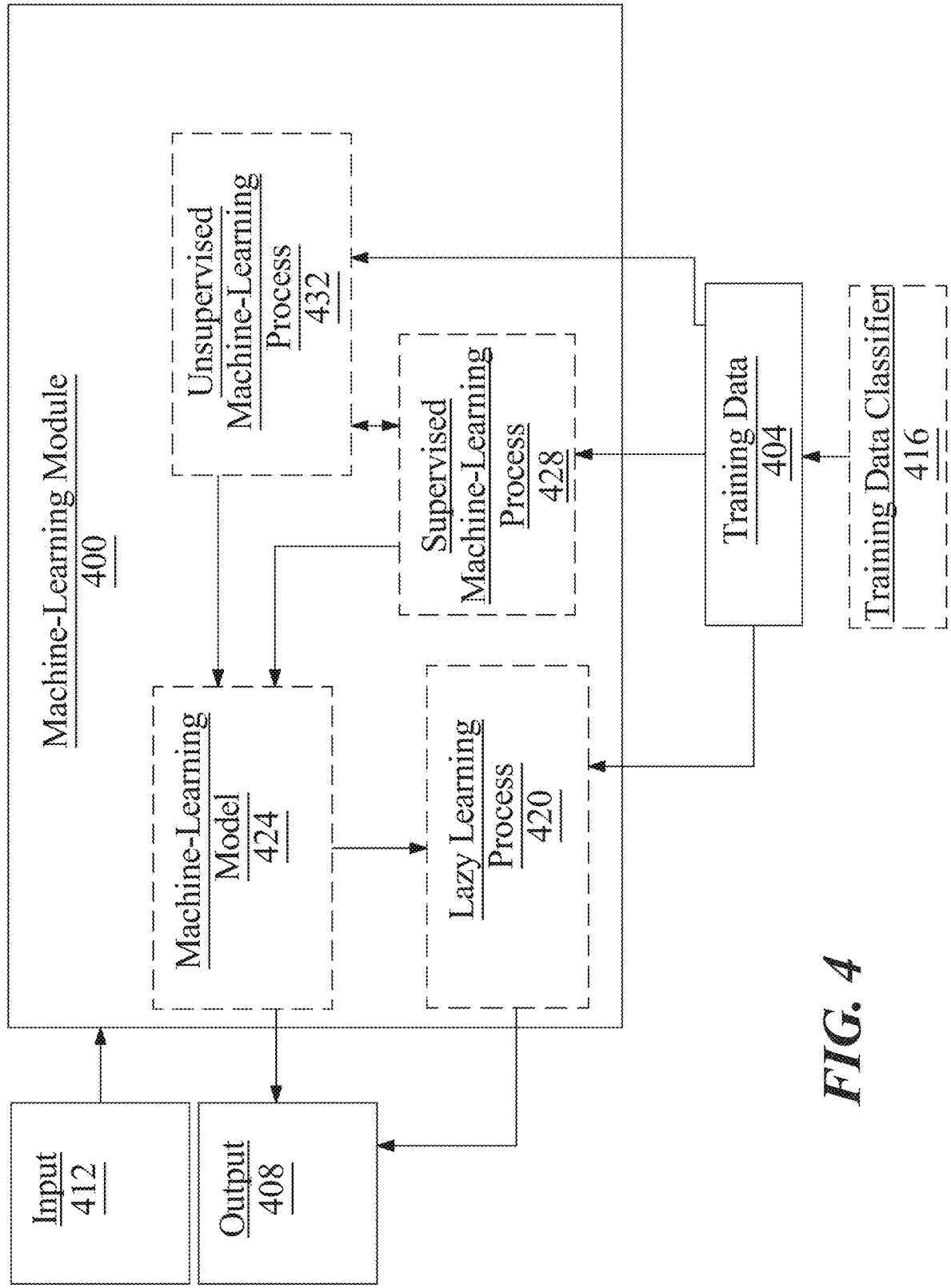
FIG. 4 is a block diagram of exemplary machine-learning processes.

Referring now to FIG. 4, an exemplary embodiment of a machine-learning module 400 that may perform one or more machine-learning processes as described in this disclosure is illustrated. In one or more embodiments, machine-learning module 400 may be an example of machine-learning module 120 of computing device 104 of FIG. 1. Machine-learning module 120 may perform determinations, classification, and/or analysis steps, methods, processes, or the like as described in this disclosure using machine-learning processes. A "machine-learning process," as used in this disclosure, is a process that automatedly uses training data 404 to generate an algorithm that will be performed by a computing device/module (e.g., computing device 104 of FIG. 1) to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include multiple data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. /// As a non-limiting illustrative example, input data may include one or more instances of any one or more of commitment datum 108, novelty datum 112, skill factor datum 116, and/or target datum 118, as well as external entity interaction datum 158 and/or user attributes 154, to provide customized skill factor datum 224B of as may be calculated as described earlier, such as where at least some instances of the skill factor datum 116 exceeding a threshold (e.g., that may be user-defined and input into user input field 148, or externally defined) are aggregated to define and display the customized skill factor datum to the user to a user. In addition, in one or more embodiments, the interface query data structure as described herein includes one or more interface query data structures, any one of which may include an interface that defines a set of operations supported by a data structure and related semantics, or meaning, of those operations. For example, in the context of personal performance improvement coaching, interface query data structure may include one or more interface query data structures that may appear to the user in the form of one or more text-based or other digital media-based surveys, questionnaires, lists of questions, examinations, descriptions, etc.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to iteratively refine strategies generated by strategy data generation 138 to reflect the user's preferences, such as by preparing customized skill factor datum 224B for the user to more effectively and/or efficiently progress to match target datum 118.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes for providing a skill factor (e.g., of skill factor datum 116) hierarchy to a user. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include one or more instances of any one or more of commitment datum 108, novelty datum 112, skill factor datum 116, and/or target datum 118, as well as external entity interaction datum 158 and/or user attributes 154 as described above as inputs, customized skill factor datum 224B and/or similar textual and/or visual imagery (e.g., digital photos and/or videos) relating to providing a skill factor hierarchy to a user as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
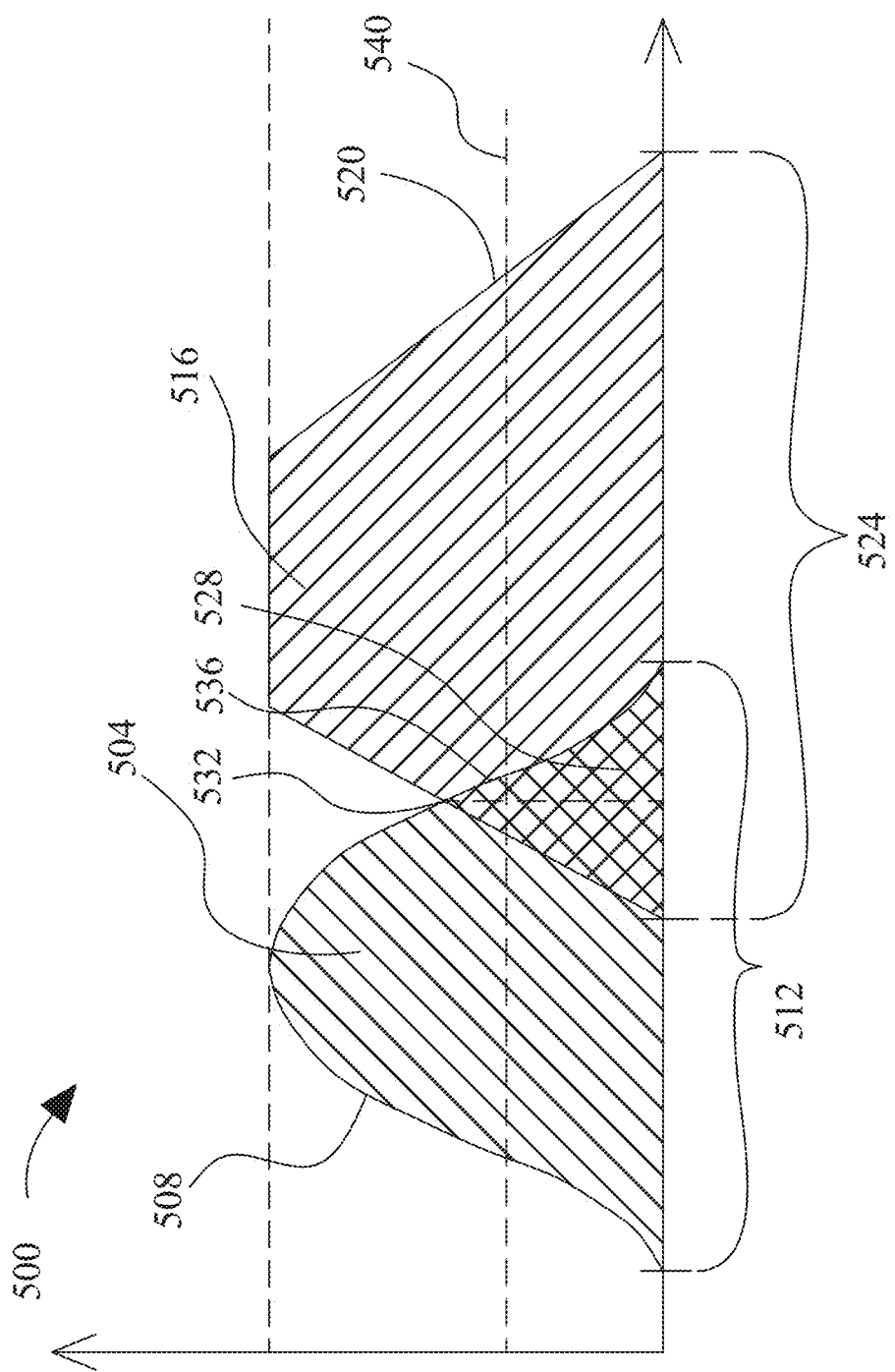
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of commitment datum 108, novelty datum 112, skill factor datum 116, and/or target datum 118, as well as external entity interaction datum 158 and/or user attributes 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of commitment datum 108, novelty datum 112, skill factor datum 116, and/or target datum 118, as well as external entity interaction datum 158 and/or user attributes 154, and a predetermined class, such as without limitation, query data or information including interface query data structures stored in user activity database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of commitment datum 108, novelty datum 112, skill factor datum 116, and/or target datum 118, as well as external entity interaction datum 158 and/or user attributes 154 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of commitment datum 108, novelty datum 112, skill factor datum 116, and/or target datum 118, to as well as external entity interaction datum 158 and/or user attributes 154 stored in user activity database 300. For instance, if commitment datum 108 and/or interface query data structure 112 has a fuzzy set matching certain interface query data structure data values stored in user activity database 300 (e.g., by having a degree of overlap exceeding a threshold), computing device 104 may classify one or more instances of any one or more of commitment datum 108, novelty datum 112, skill factor datum 116, and/or target datum 118 as belonging to user attributes 154 (e.g., aspects of user behavior as demonstrated by user attributes 154 of FIG. 1 and/or user attributes 308 of FIG. 3 relating to user commitment towards achieving target datum 118). Where multiple fuzzy matches are performed, degrees of match for each respective fuzzy set may be computed and aggregated through, for instance, addition, averaging, or the like, to determine an overall degree of match.

Still referring to FIG. 5, in an embodiment, commitment datum 108 and/or novelty datum 112 may be compared to multiple user activity database 300 categorization fuzzy sets. For instance, commitment datum 108 and/or novelty datum 112 may be represented by a fuzzy set that is compared to each of the multiple user activity database 300 categorization fuzzy sets; and a degree of overlap exceeding a threshold between the commitment datum 108 and/or novelty datum 112 fuzzy set and any of the multiple query database 300 categorization fuzzy sets may cause computing device 104 to classify one or more instances of any one or more of commitment datum 108, novelty datum 112, skill factor datum 116, and/or target datum 118 as belonging to one or more corresponding interface query data structures associated with user activity database 300 categorization (e.g., selection from categories in user activity database 300, etc.). For instance, in one embodiment there may be two user activity database 300 categorization fuzzy sets, representing, respectively, user activity database 300 categorization (e.g., into each of user-input datum 304, user attributes 308, external entity interaction datum 312, and/or user activity pattern datum 316). For example, a First user activity database 300 categorization may have a first fuzzy set; a Second user activity database 300 categorization may have a second fuzzy set; and one or more instances of any one or more of commitment datum 108, novelty datum 112, skill factor datum 116, and/or target datum 118, to as well as external entity interaction datum 158 and/or user attributes 154 may each have a corresponding fuzzy set. Computing device 104, for example, may compare one or more instances of any one or more of commitment datum 108, novelty datum 112, skill factor datum 116, and/or target datum 118, to as well as external entity interaction datum 158 and/or user attributes 154 fuzzy sets with fuzzy set data describing each of the categories included in user activity database 300, as described above, and classify one or more instances of any one or more of commitment datum 108, novelty datum 112, skill factor datum 116, and/or target datum 118, to as well as external entity interaction datum 158 and/or user attributes 154 to one or more categories (e.g., user-input datum 304, user attributes 308, external entity interaction datum 312, and/or user activity pattern datum 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, commitment datum 108 fuzzy set and/or novelty datum 112 fuzzy set may be derived from outputs of one or more machine-learning models that take commitment datum 108 and/or novelty datum 112 directly or indirectly as inputs.

Still referring to FIG. 5, a computing device may use a logic comparison program, such as, but not limited to, a fuzzy logic model to determine a user activity database 300 response. A user activity database 300 response may include, but is not limited to, accessing and/or otherwise communicating with any one or more of user-input datum 304, user attributes 308, external entity interaction datum 312, user activity pattern datum 316, and the like; each such user activity database 300 response may be represented as a value for a linguistic variable representing user activity database 300 response or in other words a fuzzy set as described above that corresponds to a degree of matching between data describing commitment datum 108 and/or novelty datum 112 and one or more categories within user activity database 300 as calculated using any statistical, machine-learning, or other method that may occur to a person skilled in the art upon reviewing the entirety of this disclosure. In some embodiments, determining a user activity database 300 categorization may include using a linear regression model. A linear regression model may include a machine-learning model. A linear regression model may be configured to map data of commitment datum 108 and/or novelty datum 112, to one or more user activity database 300 parameters. A linear regression model may be trained using a machine-learning process. A linear regression model may map statistics such as, but not limited to, quality of commitment datum 108 and/or novelty datum 112. In some embodiments, determining user activity database 300 of commitment datum 108 and/or novelty datum 112 may include using a user activity database 300 classification model. A user activity database 300 classification model may be configured to input collected data and cluster data to a centroid based on, but not limited to, frequency of appearance, linguistic indicators of quality, and the like. Centroids may include scores assigned to them such that quality of commitment datum 108 and/or novelty datum 112 may each be assigned a score. In some embodiments, user activity database 300 classification model may include a K-means clustering model. In some embodiments, user activity database 300 classification model may include a particle swarm optimization model. In some embodiments, determining the user activity database 300 of commitment datum 108 and/or novelty datum 112 may include using a fuzzy inference engine (e.g., to assess the progress of the user and use said data to amend or generate new strategies based on user progress). A fuzzy inference engine may be configured to map one or more instances of any one or more of commitment datum 108, novelty datum 112, skill factor datum 116, and/or target datum 118, to as well as external entity interaction datum 158 and/or user attributes 154 data elements using fuzzy logic. In some embodiments, described datum may be arranged by a logic comparison program into query database 300 arrangement. A "user activity database 300 arrangement" as used in this disclosure is any grouping of objects and/or data based on similarity to each other and/or relation to providing customized skill factor datum 224B of FIG. 2B to the user for the user to achieve. This step may be implemented as described above in FIG. 1. Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to commitment datum 108 and/or novelty datum 112, such as a degree of matching between data describing user aspirations and strategies based on responses to interface query data structures stored in user activity database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
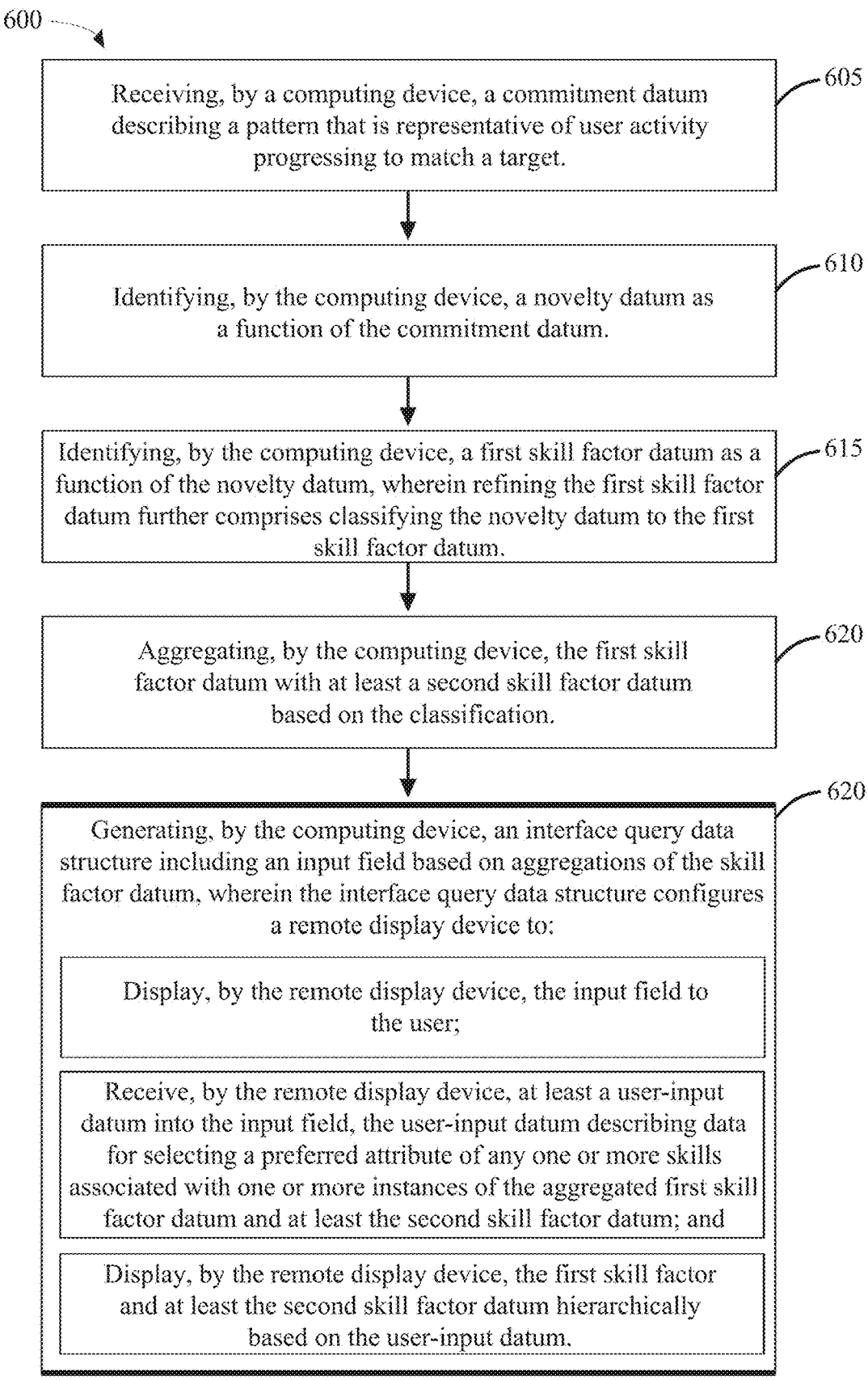
FIG. 6 is a flow diagram of an exemplary method for providing a customized skill factor datum to a user.

Now referring to FIG. 6, method 600 for. At step 605, method 600 includes receiving, by computing device 104 of FIG. 1, commitment datum 108 describing a pattern that is representative of user activity progressing to match a target. This step may be implemented as described above, without limitation, in FIGS. 1-7.

Still referring to FIG. 6, at step 610, method 600 includes identifying, by computing device 104, novelty datum 112 as a function of the commitment datum. This step may be implemented as described above, without limitation, in FIGS. 1-7.

Still referring to FIG. 6, at step 615, method 600 includes identifying, by computing device 104, a first skill factor datum as a function of the novelty datum, wherein refining the first skill factor datum further comprises classifying novelty datum 112 to the first skill factor datum. This step may be implemented as described above, without limitation, in FIGS. 1-7.

Still referring to FIG. 6, at step 620, method 600 includes generating, by computing device 104, an interface query data structure including an input field based on aggregations of the skill factor datum. The interface query data structure configures display device 132 to display the input field to the user.

In addition, the interface query data structure configures display device 132 to receive at least user-input datum 224A into user input field 148. User-input datum 224A describes data for selecting a preferred attribute of any one or more skills associated with one or more instances of the aggregated first skill factor datum and at least the second skill factor datum. In addition, the interface query data structure configures display device 132 to display the first skill factor and at least the second skill factor datum hierarchically based on user-input datum 224A. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
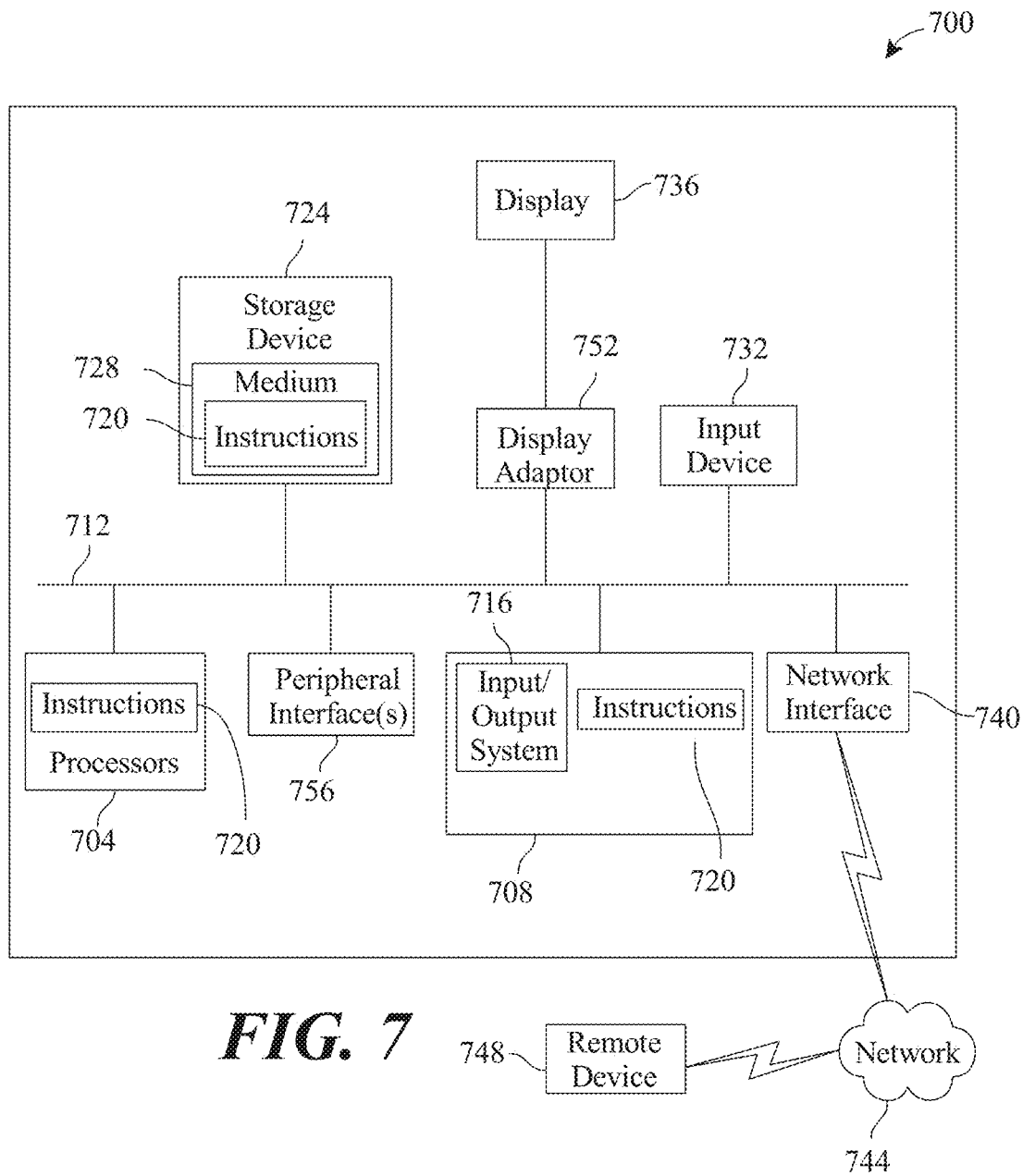
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Video display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for providing a skill factor hierarchy to a user, the apparatus comprising:
   at least a processor;
   a memory connected to the processor, the memory containing instructions configuring the processor to:
   receive a commitment datum describing a pattern that is representative of user activity progressing to match a target;
   receive a target datum;
   identify a novelty datum as a function of the commitment datum;
   identify a first skill factor datum as a function of the novelty datum; and
   refine the first skill factor datum which further comprises:
     classifying the novelty datum to the first skill factor datum using a machine learning model comprising a classifier which further comprises:
       receiving training data, wherein the training data is a data set that correlates a plurality of novelty datum to a plurality of first skill datum;
       generating the machine learning model, wherein the machine learning model comprises an input layer of nodes, at least one intermediate layer, and an output layer of nodes, wherein a connection between the nodes is created;
       training, iteratively, the machine learning model using the training data, wherein training the machine learning model includes retraining the machine learning model with feedback from previous iterations of the machine learning model, wherein the connection between nodes in adjacent layers is adjusted to produce values at the output layer of nodes; and
       refining, as a function of the trained machine learning model, the first skill factor datum;
     aggregating the first skill factor datum with at least one second skill factor datum based on the classification to output a customized skill factor for the user to attain the target datum; and
   generate an interface query data structure including an input field based on the aggregation of the first skill factor datum with the at least one second skill factor datum, wherein the interface query data structure configures a remote display device to:
     display the input field to the user;
     receive at least one user-input datum into the input field, the at least one user-input datum describing data for selecting a preferred attribute of any one or more skills associated with one or more instances of the aggregated first skill factor datum with the at least one second skill factor datum, wherein the preferred attribute comprises a confidence attribute;
     classify the at least one user-input datum as a function of the target datum; and
     display the first skill factor datum and the at least one second skill factor datum hierarchically based on the classified at least a user-input datum.

2. The apparatus of claim 1, wherein the processor is further configured to:
   retrieve data describing attributes of the user from a database communicatively connected to the processor; and
   generate the interface query data structure based on the data describing attributes of the user.

3. The apparatus of claim 1, wherein the processor is further configured to:
   retrieve data describing current preferences of the user between a minimum value and a maximum value from a database communicatively connected to the processor; and generate the interface query data structure based on the data describing current preferences of the user.

4. The apparatus of claim 1, wherein the processor is further configured to:
extract the commitment datum from a database communicatively connected to the processor using a plurality of scripts.

5. The apparatus of claim 4, wherein the processor is further configured to:
track data describing one or more activities of the user on the Internet.

6. The apparatus of claim 1, wherein the processor is further configured to receive the commitment datum using a plurality of data scrapers.

7. The apparatus of claim 1, wherein the processor is further configured to:
evaluate data derived from external entities.

8. The apparatus of claim 1, wherein the novelty datum includes data describing one or more activities completed by the user, wherein the one or more activities relate to the user matching the target.

9. The apparatus of claim 1, wherein the novelty datum includes data describing changes in resource sharing for the user matching the target.

10. The apparatus of claim 1, wherein the first skill factor datum and/or the second skill factor datum further comprises data describing an obstacle traversal by the user.

11. The apparatus of claim 1, wherein the processor is further configured to:
classify one or more new instances of the user-input datum with the first skill factor datum and the second skill factor datum;
generate a consecutive skill factor datum based on the classification of the one or more new instances of the user-input datum with the first skill factor datum and the second skill factor datum; and
display the first skill factor datum, the second skill factor datum, and at least the consecutive skill factor datum hierarchically based on a classification of the consecutive skill factor datum to one or more new instances of the user-input datum.

12. The apparatus of claim 1, wherein processor is further configured to:
aggregate the first skill factor datum with at least the second skill factor datum based on the classification; and
classify aggregated data to data describing a frequency of implementation of the first skill factor datum and the second skill factor datum to the target.

13. The apparatus of claim 1, wherein the interface query data structure further configures the remote display device to provide an articulated graphical display including multiple regions organized in a tree structure format, wherein each region provides one or more instances of point of interaction between the user and the remote display device.

14. A method for providing a skill factor hierarchy to a user, the method comprising:
receiving, by a computing device, a commitment datum describing a pattern that is representative of user activity progressing to match a target;
receiving, by the computing device, a target datum;
identifying, by the computing device, a novelty datum as a function of the commitment datum;
identifying, by the computing device, a first skill factor datum as a function of the novelty datum; and
refining, by the computing device, the first skill factor datum which further comprises classifying the novelty datum to the first skill factor datum using a machine learning model comprising a classifier which further comprises:
receiving training data, wherein the training data is a data set that correlates a plurality of novelty datum to a plurality of first skill datum;
generating the machine learning model, wherein the machine learning model comprises an input layer of nodes, at least one intermediate layer, and an output layer of nodes, wherein a connection between the nodes is created;
training, iteratively, the machine learning model using the training data, wherein training the machine learning model includes retraining the machine learning model with feedback from previous iterations of the machine learning model, wherein the connection between nodes in adjacent layers is adjusted to produce values at the output layer of nodes; and
refining, as a function of the trained machine learning model, the first skill factor datum;
aggregating, by the computing device, the first skill factor datum with at least one second skill factor datum based on the classification to output a customized skill factor for the user to attain the target datum;
generating, by the computing device, an interface query data structure including an input field based on aggregations of the first skill factor datum with the at least one second skill factor datum, wherein the interface query data structure configures a remote display device to:
display, by the computing device, the input field to the user;
receive, by the computing device, at least one user-input datum into the at least one input field, the user-input datum describing data for selecting a preferred attribute of any one or more skills associated with one or more instances of the aggregated first skill factor datum the at least one second skill factor datum, wherein the preferred attribute comprises a confidence attribute;
classify the at least one user-input datum as a function of the target datum; and
display, by the computing device, the first skill factor datum and the at least one second skill factor datum hierarchically based on the classified at least a user-input datum.

15. The method of claim 14, wherein generating the interface query data structure further comprises:
retrieving, by the computing device, data describing attributes of the user from a database communicatively connected to the computing device; and
generating, by the computing device, the interface query data structure based on the data describing attributes of the user.

16. The method of claim 14, wherein generating the commitment datum further comprises:
retrieving, by the computing device, data describing current preferences of the user between a minimum value and a maximum value from a database communicatively connected to the computing device; and
generating the interface query data structure based on the data describing current preferences of the user.

17. The method of claim 14, wherein receiving, by the computing device, the commitment datum further comprises:

extracting the commitment datum from a database communicatively connected to the computing device using a plurality of scripts.

18. The method of claim 17, wherein extracting, by the computing device, the commitment datum from the database communicatively connected to the computing device further comprises:
tracking data describing one or more activities of the user on the Internet.

19. The method of claim 14, wherein receiving, by the computing device, the commitment datum comprises receiving the commitment datum using a plurality of data scrapers.

20. The method of claim 14, wherein receiving, by the computing device, the commitment datum further comprises evaluating data derived from external entities.

21. The method of claim 14, wherein the novelty datum includes data describing one or more activities completed by the user, wherein the one or more activities relate to the user matching the target.

22. The method of claim 14, wherein the novelty datum includes data describing changes in resource sharing for the user matching the target.

23. The method of claim 14, wherein the skill factor datum further comprises data describing an obstacle traversal by the user.

24. The method of claim 14, further comprising evaluating, by the computing device, the user-input datum, the evaluation comprising:
classifying one or more new instances of the user-input datum with the first skill factor datum and the second skill factor datum;
generating, by the computing device, a consecutive skill factor datum based on the classification of the one or more new instances of the user-input datum with the first skill factor datum and the second skill factor datum; and
displaying, by the computing device, the first skill factor datum, the second skill factor datum, and at least the consecutive skill factor datum hierarchically based on a classification of the consecutive skill factor datum to one or more new instances of the user-input datum.

25. The method of claim 14, wherein classifying the novelty datum to at least the first skill factor datum further comprises:
aggregating the first skill factor datum with at least a second skill factor datum based on the classification; and
further classifying aggregated data to data describing a frequency of implementation of the first skill factor datum and the second skill factor datum to the target.

* * * * *